United States Patent
Anderson et al.

(10) Patent No.: US 12,222,058 B2
(45) Date of Patent: Feb. 11, 2025

(54) TAMPER RESISTANT FLUID CONNECTION ASSEMBLY WITH VISUAL CONNECTION VERIFIER

(71) Applicant: Oetiker NY, Inc., Lancaster, NY (US)

(72) Inventors: Thomas A. Anderson, North Tonawanda, NY (US); Kari Ann Sausen, Clarence, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/259,273

(22) PCT Filed: Jan. 4, 2021

(86) PCT No.: PCT/US2021/012047
§ 371 (c)(1),
(2) Date: Jun. 25, 2023

(87) PCT Pub. No.: WO2022/146450
PCT Pub. Date: Jul. 7, 2022

(65) Prior Publication Data
US 2024/0060589 A1    Feb. 22, 2024

(51) Int. Cl.
*F16L 37/23*    (2006.01)
(52) U.S. Cl.
CPC ........... *F16L 37/23* (2013.01); *F16L 2201/10* (2013.01)
(58) Field of Classification Search
CPC ..... F16L 37/23; F16L 2201/10; F16L 37/101; F16L 37/10
See application file for complete search history.

(56) References Cited

U.S. PATENT DOCUMENTS

| 1,879,364 A | 9/1932 | Lomar |
| 2,419,503 A * | 4/1947 | Scheiwer ............... F16L 37/23 |
| | | 251/149.6 |
| 2,470,256 A | 5/1949 | McIlroy |

(Continued)

FOREIGN PATENT DOCUMENTS

| DE | 1525878 | 11/1970 |
| DE | 102020127599 A1 * | 4/2022 |

(Continued)

OTHER PUBLICATIONS

Written Opinion of the International Searching Authority, PCT/US2021/012047, Nov. 1, 2021.

*Primary Examiner* — Zachary T Dragicevich
*Assistant Examiner* — James A Linford
(74) *Attorney, Agent, or Firm* — Harter Secrest & Emery LLP; Michael Nicholas Vranjes (57) ABSTRACT

A fluid connection assembly, including a connector body, including a first end, a second end, a first through-bore, a first radially outward facing surface including at least one aperture extending from the first radially outward facing surface to the first through-bore, and at least one detent arranged in the at least one aperture, and a collar connected to the connector body, the collar including a first section non-rotatably connected to the connector body, and a second section including a radially inward facing surface engaged with the first radially outward facing surface and including at least one pocket extending radially outward therefrom, wherein the second section is engaged with and rotatable with respect to the first section.

20 Claims, 7 Drawing Sheets

(56) References Cited

U.S. PATENT DOCUMENTS

| | | |
|---|---|---|
| 3,083,042 A | 3/1963 | Collar |
| 3,245,423 A * | 4/1966 | Hansen .................. F16L 37/23 251/149.6 |
| 3,817,560 A | 6/1974 | Guertin |
| 3,842,614 A | 10/1974 | Karcher et al. |
| 4,437,647 A | 3/1984 | Cruse |
| 4,884,830 A | 12/1989 | Meisinger |
| 5,056,560 A | 10/1991 | DeMartelaere |
| 5,293,902 A | 3/1994 | Lapierie |
| 5,462,316 A | 10/1995 | Street et al. |
| 6,206,432 B1 | 3/2001 | Kamiyama |
| 6,581,907 B1 | 6/2003 | Kuwabara et al. |
| 6,779,778 B2 | 8/2004 | Kuwabara |
| 10,018,294 B2 | 7/2018 | Pai |
| 2013/0291976 A1 | 11/2013 | Chang |
| 2015/0316185 A1 | 11/2015 | Mullin |
| 2017/0343128 A1 | 11/2017 | Chiu |
| 2023/0375115 A1* | 11/2023 | Sausen ................ F16L 37/0841 |

FOREIGN PATENT DOCUMENTS

| | | |
|---|---|---|
| JP | S4730117 U | 5/1972 |
| JP | H0914555 A | 1/1997 |
| JP | 2000249281 A | 12/2000 |
| JP | 2000352489 A | 12/2000 |
| NL | 244920 | 4/1966 |
| WO | 2008062212 A1 | 5/2008 |

* cited by examiner

TAMPER RESISTANT FLUID CONNECTION ASSEMBLY WITH VISUAL CONNECTION VERIFIER

CROSS-REFERENCE TO RELATED APPLICATIONS

The present application is the U.S. National Stage Application pursuant to 35 U.S.C. § 371 of International Patent Application No. PCT/US2021/012047, filed on Jan. 4, 2021, which application is incorporated herein by reference in its entirety.

FIELD

The present disclosure relates to fluid connectors, and, more particularly, to a fluid connection assembly including a retainer that prevents disassembly and comprises visual connection verification.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is refrigeration lines, which may carry a refrigerant. A refrigerant is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, during the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Other problems with existing fluid connection assembly designs is they can be easily disconnected, which may allow for dangerous refrigerant or other harmful fluids to be released into the environment. Current fluid connection assembly designs do not include tamper resistant features to prevent disassembly. Additionally, current fluid connection assembly designs do not comprise a feature that indicates an attempt to disconnect the fluid connection assembly has occurred (i.e., tamper detection feature).

Thus, there has been a long-felt need for a fluid connection assembly including a retainer that prevents disassembly, includes a visual connection verifier and tamper detection feature, and reduces the insertion force required to assemble.

SUMMARY

According to aspects illustrated herein, there is provided a fluid connection assembly, comprising a connector body, including a first end, a second end, a first through-bore, a first radially outward facing surface including at least one aperture extending from the first radially outward facing surface to the first through-bore, and at least one detent arranged in the at least one aperture, and a collar connected to the connector body, the collar including a first section non-rotatably connected to the connector body, and a second section including a radially inward facing surface engaged with the first radially outward facing surface and including at least one pocket extending radially outward therefrom, wherein the second section is engaged with and rotatable with respect to the first section.

In some embodiments, in an unlocked state, the at least one detent is engaged with the at least one pocket, and in a locked state, the at least one detent is engaged with the radially inward facing surface and extends into the first through-bore. In some embodiments, the at least one pocket increases in depth in a first circumferential direction. In some embodiments, the at least one aperture is frusto-conical. In some embodiments, the first section further comprises an arm including a protrusion, and the second section further comprises a recess, the protrusion operatively arranged to engage the recess to maintain an unlocked state of the fluid connection assembly. In some embodiments, the second section further comprises a second through-bore arranged in the recess, wherein the at least one detent is operatively arranged to engage the second through-bore to displace the protrusion radially outward. In some embodiments, the fluid connection further comprises a spring element arranged between the first section and the second section, the spring element operatively arranged to bias the fluid connection assembly toward a locked state. In some embodiments, the first section further comprises a loop, and the second section further comprises a latch operatively arranged to engage the loop to non-rotatably connect the second section and the first section. In some embodiments, the latch comprises a first radially inward portion operatively arranged to engage the loop to non-rotatably connect the second section and the first section, and a second radially outward portion completely overlapping the first radially inward portion. In some embodiments, in an unlocked state, the second section is rotatable with respect to the first section, and in a locked state, the second section is non-rotatably connected to the first section. In some embodiments, the fluid connection assembly further comprises a retaining ring operatively arranged in a groove of the connector body to connect the collar to the connector body. In some embodiments, the fluid connection assembly further comprises a tube including a shoulder, wherein the at least one detent is arranged to engage the shoulder to secure the tube to the connector body. In some embodiments, the shoulder comprises a first frusto-conical surface increasing in diameter in a first axial direction, and a second frusto-conical surface extending from the first frusto-conical surface, the second frusto-conical surface decreasing in diameter in the first axial direction.

According to aspects illustrated herein, there is provided a fluid connection assembly, comprising a connector body, including a first end, a second end, a first through-bore, a first radially outward facing surface including at least one aperture extending from the first radially outward facing surface to the first through-bore, and at least one detent arranged in the at least one aperture, and a collar connected to the connector body, the collar including a first section non-rotatably connected to the connector body, a second section including a radially inward facing surface engaged with the first radially outward facing surface and including at least one pocket extending radially outward therefrom, wherein the second section is engaged with and rotatable with respect to the first section, and a spring element arranged between the first section and the second section, the spring element operatively arranged to bias the fluid connection assembly toward a locked state.

In some embodiments, in an unlocked state, the at least one detent is engaged with the at least one pocket, and in the locked state, the at least one detent is engaged with the radially inward facing surface and extends into the first through-bore. In some embodiments, the at least one pocket increases in depth in a first circumferential direction. In some embodiments, the first section further comprises an arm including a protrusion, and the second section further comprises a recess, the protrusion operatively arranged to engage the recess to maintain an unlocked state of the fluid connection assembly. In some embodiments, the second section further comprises a second through-bore arranged in the recess, wherein the at least one detent is operatively arranged to engage the second through-bore to disengage the protrusion from the recess. In some embodiments, the first section further comprises a loop, and the second section further comprises a latch operatively arranged to engage the loop to non-rotatably connect the second section and the first section. In some embodiments, the latch comprises a first radially inward portion operatively arranged to engage the loop to non-rotatably connect the second section and the first section, and a second radially outward portion completely overlapping the first radially inward portion.

According to aspects illustrated herein, there is provided a locking tamper resistant fluid quick connect or connection assembly including visual connection verification. The fluid connection assembly provides for quick connection during automotive assembly line conditions for air conditioning lines that carry refrigerant or other fluid. The fluid connection assembly also provides a visual indication that a full engagement of the fluid connection assembly has been achieved.

The fluid connection assembly the present disclosure provides a user a tool and hardware-free fluid connection assembly having a visual connection verification for use in fluid lines (e.g., air conditioning lines carrying refrigerant). The fluid connection assembly removes the need for tools (e.g., power tools) and decreases possible harmful ergonomics caused by awkward assembly positions during tube connection. The fluid connection assembly comprises a positive visual indicator that the tube end form has been fully engaged into the connector body, as well as tamper detection after the connection has been produced. In some embodiments, the fluid connection assembly comprises a collar including at least one ball that forces the sealing face of the tube end form into the face of the connector body. The at least one ball is arranged on a radially inward facing surface of the collar. The collar is rotated, which forces the ball radially inward and the sealing face of the tube end form into engagement with the sealing surface of the connector body. In some embodiments, the fluid connection assembly comprises a tamper detection locking feature that indicates if the locked connection has been tampered with (i.e., an unauthorized attempt to disconnect the fluid connection assembly).

In some embodiments, the fluid connection assembly comprises a collar that is rotated to engage balls that force the tube end form into a sealing area of the connector body. Once the collar is fully turned, a locking feature non-rotatably connects the collar to the connector body to prevent the tube end form from being removed from the connector body. A tamper deterrent detection feature covers the locking feature to prevent it from being released. In some embodiments, the locking feature may comprise a color scheme to indicate full engagement of the locking feature and thus the tube within the connector body. For example, the locking feature may comprise an arm and a protrusion that engages a recess. The recess may comprise a section having a color (e.g., red) that is visible in the locked state (i.e., when the protrusion is not engaged with the recess) and not visible in the unlocked state (i.e., when the protrusion is engaged with the recess). The engagement of the protrusion with the recess in the unlocked position prevents the collar from snapping to the locked position due to the biasing force of the spring element. The locking element further comprises a latch and a loop, wherein the latch engages the loop to non-rotatably lock the collar with the connector body. In some embodiments, the latch cannot be disengaged from the loop unless it is plastically deformed, thereby indicating tampering has occurred.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

By "non-rotatably connected" elements, we mean that: the elements are connected so that whenever one of the elements rotate, all of the elements rotate; and, relative rotation between the elements is not possible. Radial and/or axial movement of non-rotatably connected elements with respect to each other is possible, but not required. By "rotatably connected" elements, we mean that: the elements are rotatable with respect to each other.

Figure 1A:
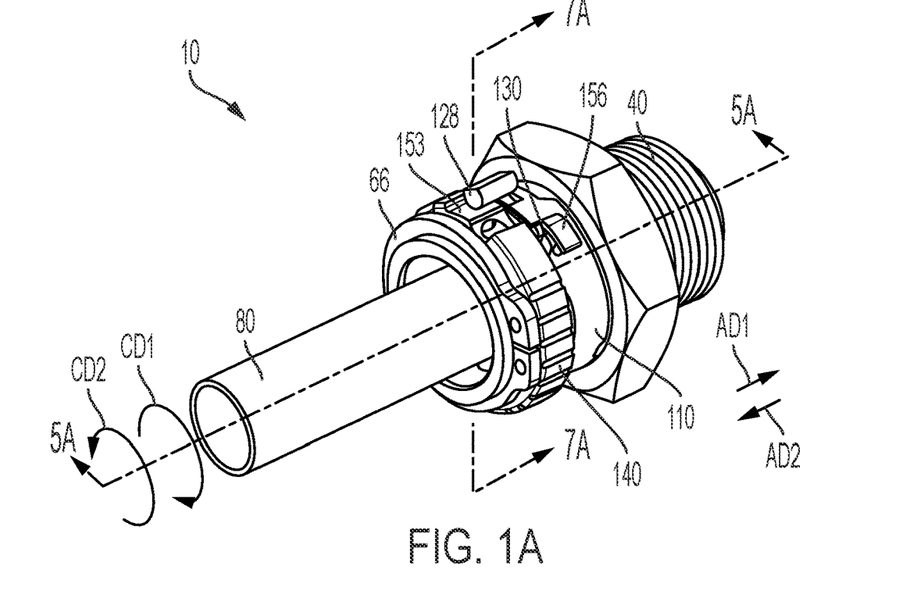
FIG. 1A is a perspective view of a fluid connection assembly, in a locked state.
Figure 1B:
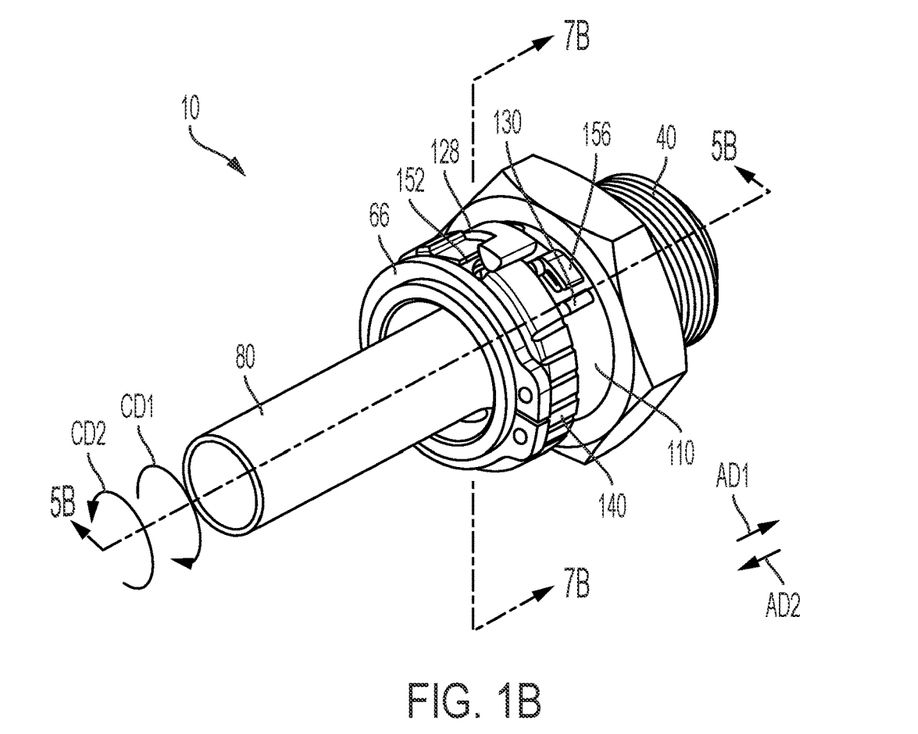
FIG. 1B is a perspective view of the fluid connection assembly shown in FIG. 1A, in an unlocked state.
Figure 2:
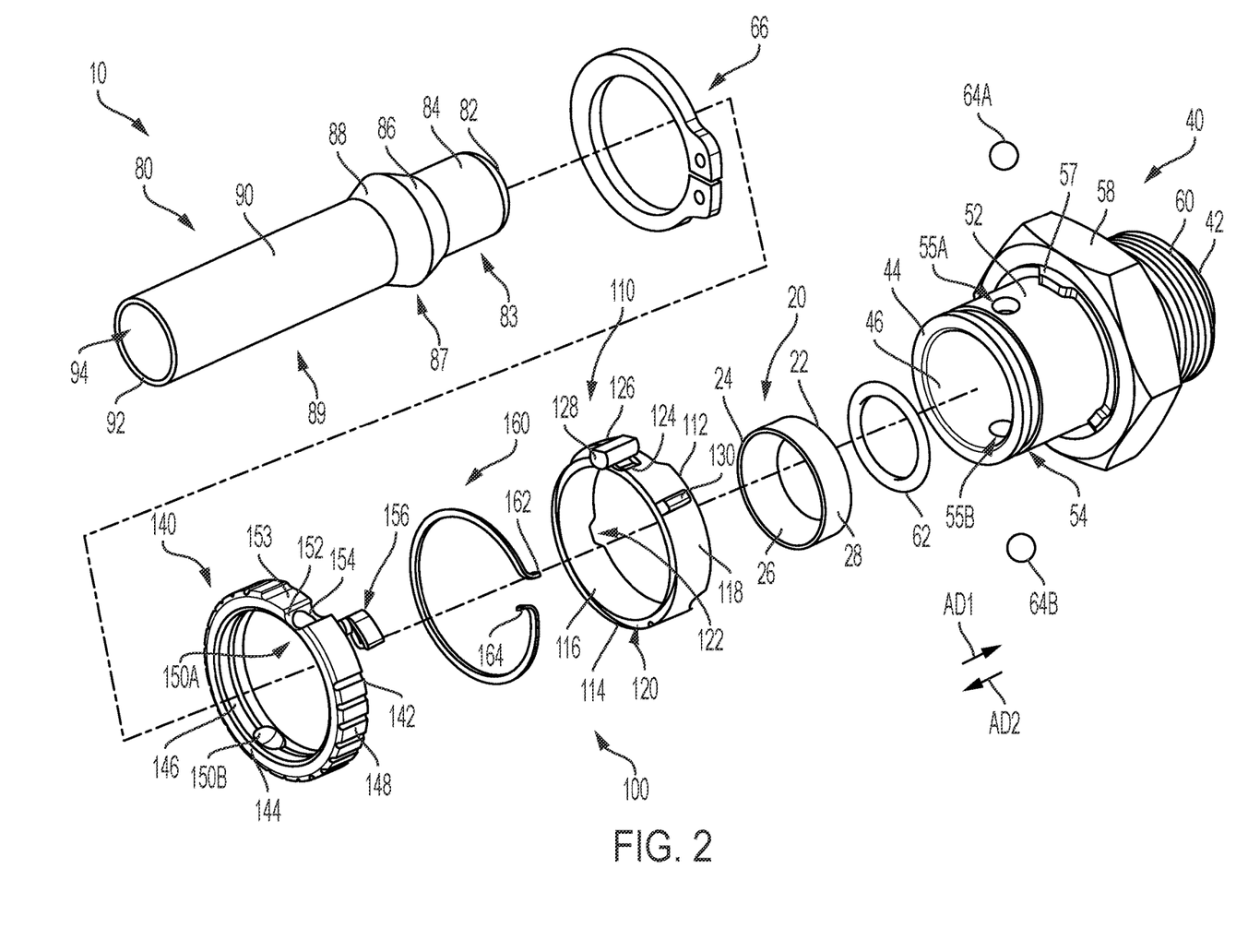
FIG. 2 is an exploded perspective view of the fluid connection assembly shown in FIG. 1A.
Figure 3:
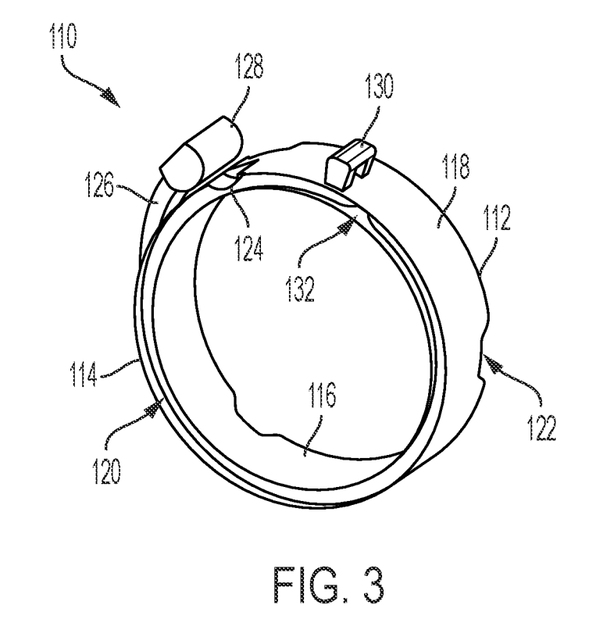
FIG. 3 is a perspective view of a first section of the collar.
Figure 4:
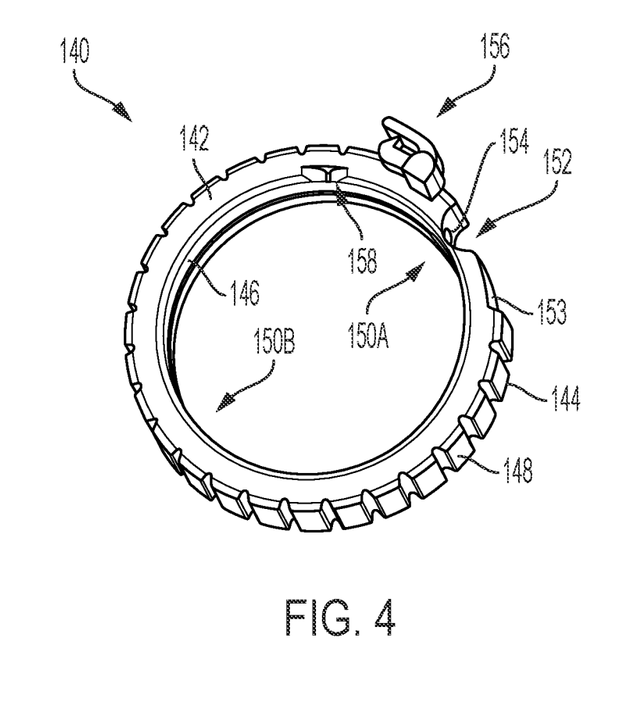
FIG. 4 is a perspective view of a second section of the collar.
Figure 5A:
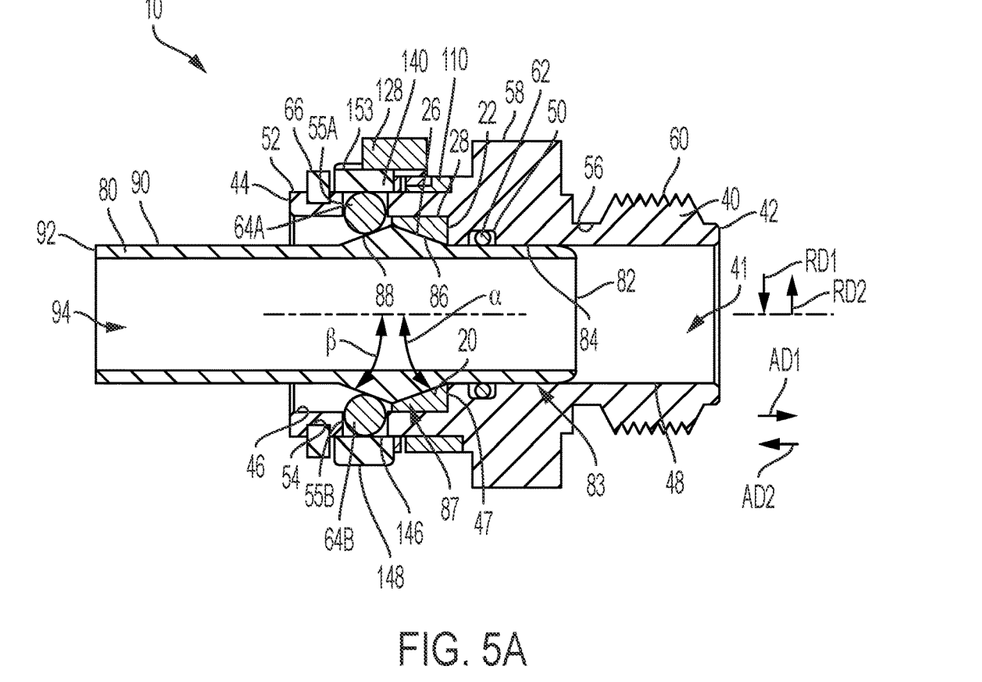
FIG. 5A is a cross-sectional view of the fluid connection assembly taken generally along line 5A-5A in FIG. 1A.
Figure 5B:
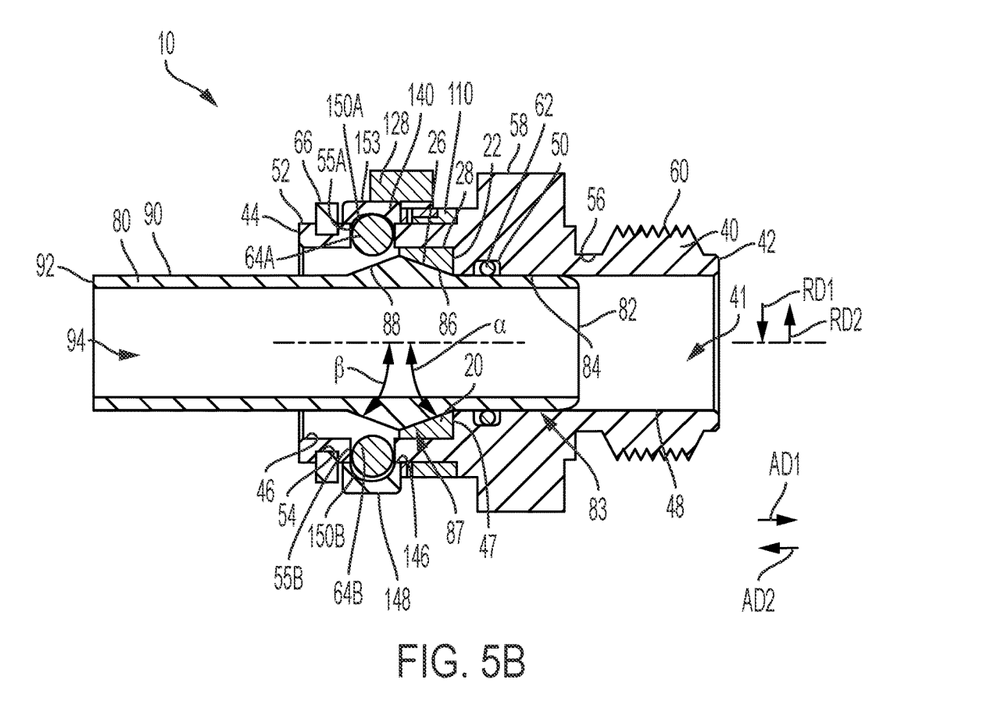
FIG. 5B is a cross-sectional view of the fluid connection assembly taken generally along line 5B-5B in FIG. 1B.
Figure 6A:
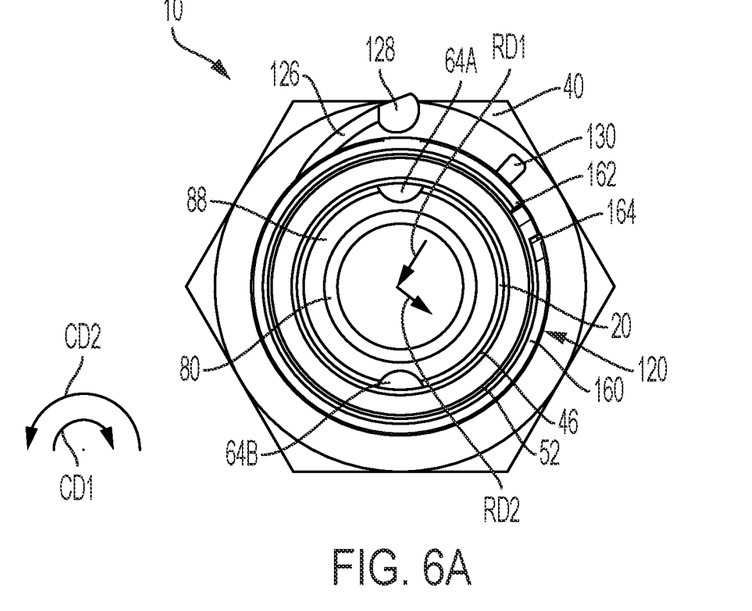
FIG. 6A is a partial elevational view of the fluid connection assembly shown in FIG. 1A.
Figure 6B:
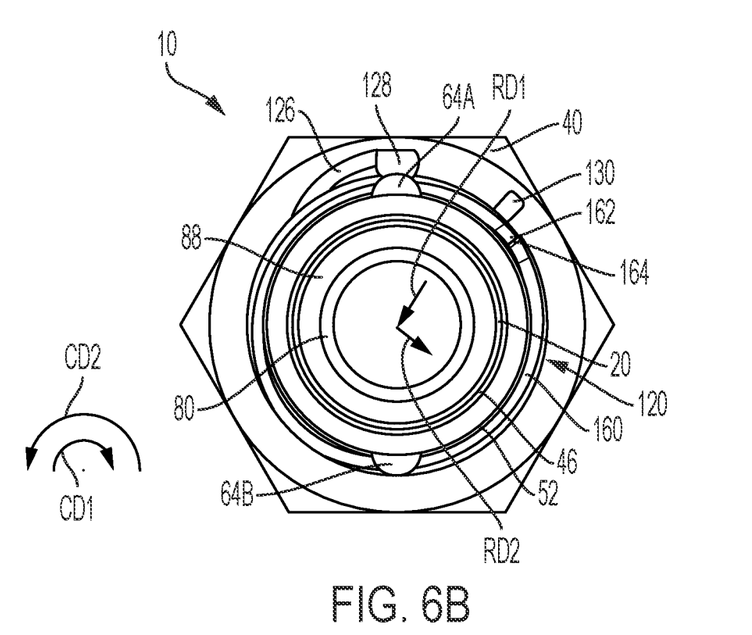
FIG. 6B is a partial elevational view of the fluid connection assembly shown in FIG. 1B.
Figure 7A:
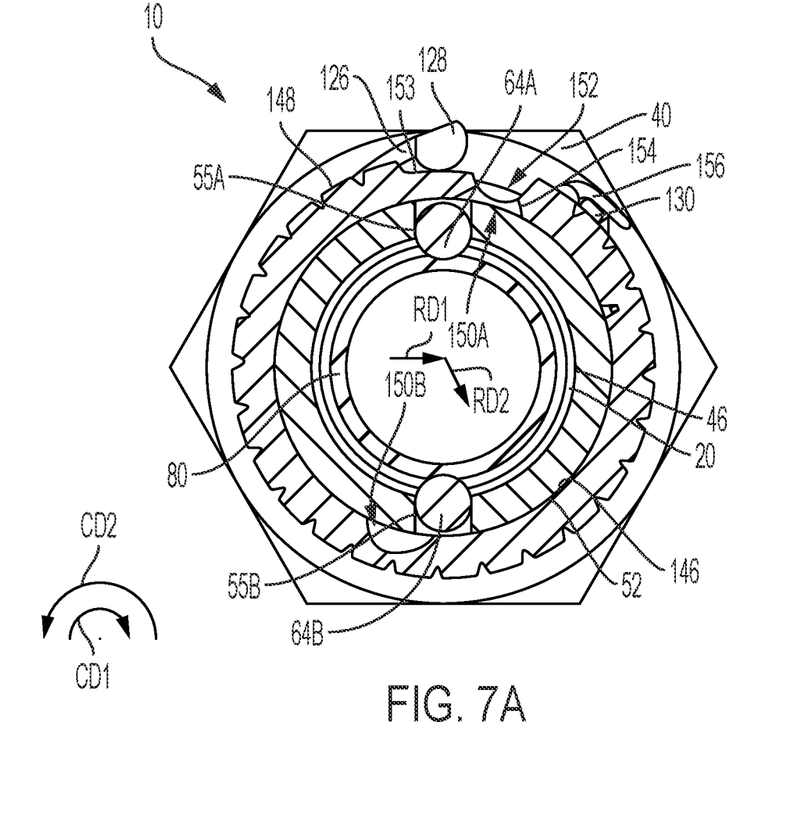
FIG. 7A is a cross-sectional view of the fluid connection assembly taken generally along line 7A-7A in FIG. 1A; and, FIG. 7B is a cross-sectional view of the fluid connection assembly taken generally along line 7B-7B in FIG. 1B.
Figure 7B:
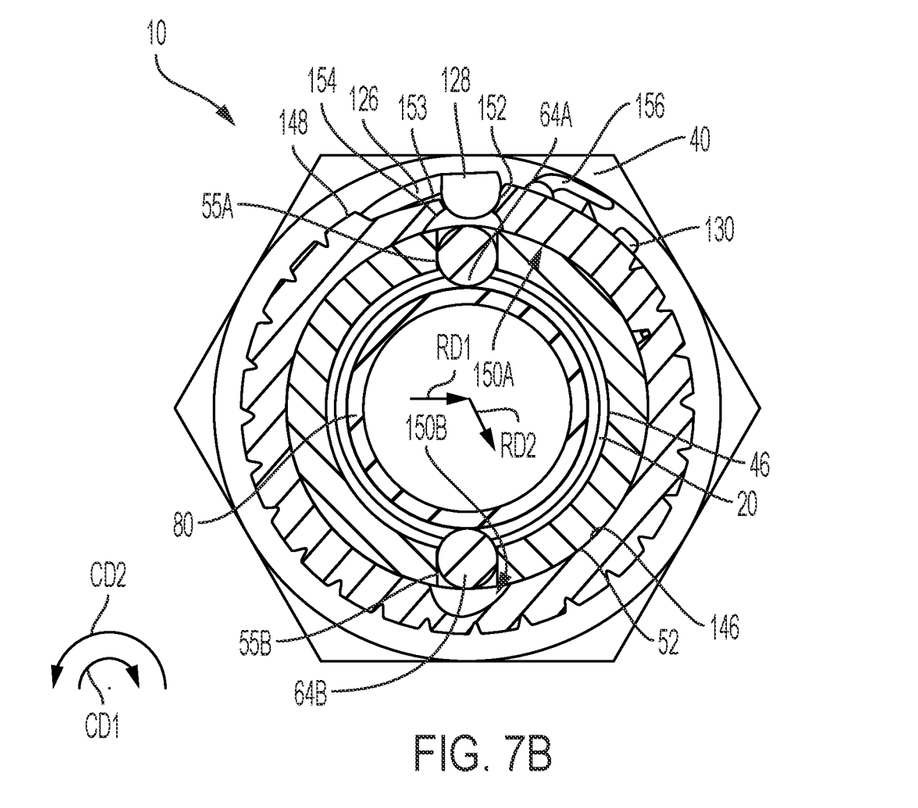

Adverting now to the figures, FIG. 1A is a perspective view of fluid connection assembly 10, in a locked state. FIG. 1B is a perspective view of fluid connection assembly 10, in an unlocked state. FIG. 2 is an exploded perspective view of fluid connection assembly 10. FIG. 3 is a perspective view of first section 110 of the collar 100. FIG. 4 is a perspective view of second section 140 of collar 110. FIG. 5A is a cross-sectional view of fluid connection assembly 10 taken generally along line 5A-5A in FIG. 1A. FIG. 5B is a cross-sectional view of fluid connection assembly 10 taken generally along line 5B-5B in FIG. 1B. FIG. 6A is a partial elevational view of fluid connection assembly 10, in the locked state. FIG. 6B is a partial elevational view of fluid connection assembly 10, in the unlocked state. FIG. 7A is a cross-sectional view of fluid connection assembly 10 taken generally along line 7A-7A in FIG. 1A. FIG. 7B is a cross-sectional view of fluid connection assembly 10 taken generally along line 7B-7B in FIG. 1B. Fluid connection assembly 10 generally comprises connector body 40, tube 80, and collar 100. The following description should be read in view of FIGS. 1A-7B.

Tube 80 comprises end 82, section 83, shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical or curvilinear taper proximate end 82 (see FIGS. 3A-B). In some embodiments, section 83 further comprises a raised section arranged between radially outward facing surface 84 and shoulder 87. Shoulder 87 is arranged between section 83 and section 89 and comprises radially outward facing surface 86 and radially outward facing surface 88. As shown, radially outward facing surface 86 is a frusto-conical surface extending from radially outward surface 84 to surface 88. Radially outward facing surface 86 increases in diameter is axial direction AD2. In some embodiments, radially outward facing surface 86 is an axial surface facing at least partially in axial direction AD1. In some embodiments, tube 80 comprises a constant diameter radially outward facing surface arranged between radially outward facing surface 86 and radially outward facing surface 88. Radially outward facing surface 88 is a frusto-conical surface extending from radially outward surface 86 to radially outward facing surface 90. Radially outward facing surface 88 increases in diameter is axial direction AD1. In some embodiments, radially outward facing surface 88 is an axial surface facing at least partially in axial direction AD2. Section 89 is arranged between shoulder 87 and end 92 and comprises radially outward facing surface 90. Radially outward facing surface 90 includes a substantially constant diameter. In some embodiments, section 89 further comprises a raised section arranged between radially outward facing surface 88 and radially outward facing surface 90. In some embodiments, radially outward facing surface 86 is arranged at angle α relative to a central axis of tube 80 and radially outward facing surface 88 is arranged at angle β relative to the central axis of tube 80, angle α being equal to angle β (see FIGS. 5A-B).

Tube 80 is arranged to be inserted, specifically with end 82 first, into connector body 40, specifically through-bore 41. Tube 80 is inserted into connector body 40 in axial direction AD1 until shoulder 87 axially clear balls or detents 64A and 64B (i.e., shoulder 87, specifically radially outward facing surface 86, is arranged on the right side of balls 64A-B as shown in FIGS. 5A-B). It is the engagement of balls 64A-B with radially outward facing surface 88 that secures tube 80 within connector body 40. It should be appreciated that tube 80 may be any traditional tube comprising a bead, radially outward extending protrusion or flange, or ramp profile, which extends radially outward and axially on the outer surface of the tube, to displace and engage with balls 64A-B of collar 20 and secure the tube within the connector body. In some embodiments, tube 80 comprises a metal. In some embodiments, tube 80 comprises a nonmetal (e.g., polymer, rubber, ceramic, etc.).

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed in is a condenser, evaporator, or pump. It should be appreciated that fluid connector 10 may be used in various other components, assemblies, and subassemblies in which fluid connection is desired. Radially outward facing surface 60 may further comprise groove 56. A seal or O-ring is arranged in groove 56 to create a fluid tight seal between connector body 40 and the component it is connected to. Seal 62 is arranged in connector body 40. Specifically, seal 62 is arranged in groove 50 to engage tube 80 (i.e., radially outward facing surface 84). Groove 50 is arranged in radially inward facing surface 48. In some embodiments, seal 62 is an O-ring.

In some embodiments, and as shown, radially inward facing surface 46 is a substantially cylindrical surface. In some embodiments, radially inward facing surface 46 comprises a frusto-conical surface or radially outward extending taper proximate end 44. In some embodiments, radially inward facing surface 48 is a substantially cylindrical surface. Surface 47 connects surface 46 and surface 48. In some embodiments, surface 47 is an axially facing surface. In some embodiments, surface 47 is a frusto-conical surface. Surface 47 is operatively arranged to engage shoulder 87, specifically, to prevent axial displacement of tube 80 is axial direction AD1 with respect to connector body 40.

In some embodiments, seal 20 is arranged in through-bore 41 of connector body 40. Seal 20 comprises end 22, end 24, radially inward facing surface 26, and radially outward facing surface 28. End 22 is arranged to sealingly engage and/or abut against surface 47, radially outward facing surface 28 is arranged to sealingly engage or abut against radially inward facing surface 46, and radially inward facing surface 26 is arranged to sealingly engage or abut against radially outward facing surface 86. In some embodiments, radially inward facing surface 26 is frusto-conical and increases in diameter in axial direction AD2. Seal 20 is operatively arranged to provide an additional fluid seal (i.e., in addition to seal 62) between tube 80 and connector body 40.

Groove 54 is arranged in radially outward facing surface 52. Groove 54 is arranged axially between end 44 and head 58. In some embodiments, groove 54 is arranged axially between and spaced apart from end 44 and head 58. Retaining ring 66 is operatively arranged to engage groove 54 to rotatably connect collar 20 and connector body 40. When fully engaged in groove 54, retaining ring 66 is rotatably connected to connector body 40 and prevents axial displacement of collar 20 in axial direction AD2 with respect to connector body 40.

Connector body 40 further comprises one or more apertures (e.g., apertures 55A and 55B) arranged in radially outward facing surface 52. Specifically, apertures 55A and 55B are arranged axially between groove 54 and head 58 and extend from radially outward facing surface 52 to through-bore 41. Apertures 55A and 55B are operatively arranged to allow balls 64A and 64B to extend therethrough and engage shoulder 87 to secure tube 80 within connector body 40. In some embodiments, apertures 55A-B are generally conical or frusto-conical (i.e., decrease in diameter in radially inward in radial direction RD1). Such design allows balls 64A-B to extend only partially into through-bore 41, thereby preventing balls 64A-B from falling into through-bore 41. Thus, a radially innermost diameter of apertures 55A-B is less than the diameter of balls 64A-B and prevents displacement of balls 64A-B in radial direction RD1.

In some embodiments, connector body 40 further comprises one or more protrusions 57 extending in axial direction AD2 from head 58 and radially outward in radial direction RD2 from radially outward facing surface 52. Protrusions 57 may be integrally formed with connector body 40 or fixedly secured thereto, and are arranged to non-rotatably connect first section 110 to connector body 40. Specifically, protrusions 57 are operatively arranged to engage notches 122 of first section 110. In some embodiments, connector body 40 comprises a metal. In some embodiments, connector body 40 comprises a polymer. In some embodiments, connector body 40 comprises a ceramic.

Collar or locking collar 100 is operatively arranged to be connected to connector body 40. Collar 100 generally comprises first section 110, second section 140, and spring element 160.

First section 110 comprises end 112, end 114, radially inward facing surface 116, and radially outward facing surface 118. First section 110 is operatively arranged to be non-rotatably connected to connector body 40. In some embodiments, and as best shown in FIGS. 1A-2, end 112 comprises one or more notches 122 that engage protrusions 57 to non-rotatably connect first section 110 and connector body 40. It should be appreciated that first section 110 can be non-rotatably connected to connector body 40 using any suitable means, for example, bolts, rivets, screw, nails, dowels, adhesives, welding, soldering, etc. End 112 is arranged to engage or be in proximity to head 58. End 114 is arranged to engage second section 140 and comprises channel 120. Channel 120 is arranged radially between radially inward facing surface 116 and radially outward facing surface 118, and extends from end 114 in axial direction AD1. Channel 120 is arranged to at least partially house and/or engage spring element or torsion spring 160. In some embodiments, channel 120 further comprises crevice 132 (see FIG. 3).

First section 110 further comprises arm 126 extending radially outward in radial direction RD2 from and in circumferential direction CD1 with respect to radially outward facing surface 118. In some embodiments, arm 126 is axially aligned with end 114. Arm 126 is elastically deformable and is operatively arranged to be displaced generally in radial directions RD1 and RD2 with respect to radially outward facing surface 118. At its distal end, arm 126 comprises protrusion 128 extending radially inward in radial direction RD1 and in axial direction AD2 therefrom. Protrusion 128 is operatively arranged to engage recesses 152 and 153, and be aligned with through-bore 154 to engage ball 64A to maintain an unlocked state and provide an automatic lock feature, as will be described in greater detail below.

First section 110 further comprises loop 130 extending radially outward in radial direction RD2 from radially outward facing surface 118. Loop 130 is arranged to engage latch 156 to non-rotatably connect second section 140 and first section 110, as will be described in greater detail below. In some embodiments, radially outward facing surface 118 further comprises recess 124. In an unlocked state, arm 126 is in a non-deformed state and protrusion 128 is engaged with recess 124 (and recess 152), as is best shown in FIGS. 1B and 6B. In a locked state, arm 126 is elastically deformed radially outward and protrusion 128 is engaged with recess 153 (i.e., protrusion 128 is no longer engaged with recess 124 and 152), as best shown in FIGS. 1A, 6A, and 7A.

Second section 140 comprises end 142, end 144, radially inward facing surface 146, and radially outward facing surface 148. Second section 140 is operatively arranged to be rotatably connected to connector body 40. End 142 is arranged to engage and/or abut against end 114. End 142 comprises crevice 158 (see FIG. 4). End 146 is arranged to engage and/or abut against retaining ring 66.

Radially inward facing surface 146 comprises one or more pockets, for example, pockets 150A and 150B operatively arranged to engage balls 64A-B, respectively. Pockets 150A-B extend radially outward in radial direction RD2 from radially inward facing surface 146. As best shown in FIGS. 7A-B, pockets 150A and 150B increase in depth in circumferential direction CD1. At their deepest portion, pockets 150A-B allow balls 64A-B to displace radially outward in radial direction RD2 and disengage shoulder 87, thereby allowing tube 80 to be removed from connector body 40 (i.e., the unlocked state). At their shallowest portion, pockets 150A-B force balls 64A-B radially inward in radial direction RD1 to engage shoulder 87, thereby preventing tube 80 from being removed from connector body 40 (i.e., the locked state). Since pockets 150A-B gradually decrease in depth, fluid connection assembly 10 can be changed from the unlocked position, shown in FIGS. 1B, 5B, 6B, and 7B, to the locked position, shown in FIGS. 1A, 5A, 6A, and 7A, by displacing or rotating second section 140 in circumferential direction CD1 with respect to first section 110. Fluid connection assembly 10 can be changed from the locked position, shown in FIGS. 1A, 5A, 6A, and 7A, to the unlocked position, shown in FIGS. 1B, 5B, 6B, and 7B, by displacing or rotating second section 140 in circumferential direction CD2 with respect to first section 110. In some embodiments, in the locked state, balls 64A-B are engaged with radially inward facing surface 146.

Radially outward facing surface 148 further comprises recess 152 extending radially inward therefrom. In the unlocked state, protrusion 128 engages recess 152 to maintain fluid connection assembly 10 in the unlocked state. Specifically, the engagement of protrusion 128 prevents second section 140 from being rotated in circumferential direction CD2 with respect to first section 110, due to the torsional bias of spring element 160.

Recess 152 may further comprise through-bore 154 extending from radially outward facing surface 148 to radially inward facing surface 146. Recess 152 and through-bore 154 are aligned with pocket 150A. In the unlocked state, and as best shown in FIG. 7B, recess 152 and through-bore 154 are at least partially aligned with aperture 55A, and ball 64A. As tube 80 is inserted into through-bore 41, shoulder 87 engages ball 64A displacing it radially outward in radial direction RD2. Ball 64A engages protrusion 128 forcing it radially outward in radial direction RD2 and out of engagement with recess 152, at which point spring element 160 forces second section in circumferential direction CD2 and into the position shown in FIG. 7A. This is the automatic lock feature of fluid connection assembly 10.

In some embodiments, radially outward facing surface 148 comprises knurling, small ridges or beads, or grooves thereon to aid in gripping. In some embodiments, radially outward facing surface 148 comprises a constant diameter. In some embodiments, radially outward facing surface 148 comprises a variable diameter.

Second section 140 further comprises latch 156 connected to end 142. Latch 156 is arranged to engage loop 130 to non-rotatably connect second section 140 and first section 110. Latch 156 comprises a first radially inward portion including a tang extending radially outward therefrom. The first radially inward portion is arranged to go through loop 130. Latch 156 also comprises a second radially outward portion that covers, on a radially outward side, the first radially inward portion. Thus, the first radially inward portion is not accessible to disengage the tang from the loop due to arrangement of the second radially outward portion. This is the tamper resistant feature. In order to disengage the first radially inward portion tang from the loop, the second radially outward portion must be plastically deformed. This is the tamper detection feature.

Spring element 160 is generally cylindrical and comprises end 162 and end 164. In some embodiments, spring element 160 resides completely in channel 120 except for end 164 which extends in axial direction AD2 from end 114. End 162 engages crevice 134 to non-rotatably connect end 162 with first section 110. End 164 engages crevice 158 to non-rotatably connect end 164 with second section 140. Spring element 160 is operatively arranged to engage first section 110 and second section 140 to bias fluid connection assembly 10 toward the locked state. FIGS. 2 and 6A best illustrate spring element 160 in the locked state. As shown, in the locked state, spring element 160 is in a relaxed state and end 164 is spaced apart from end 164 in a circumferential direction. FIG. 6B best illustrates spring element 160 in the unlocked state. As shown, in the unlocked state, spring element 160 is in a tensed state wherein ends 162 and 164 are forced together (i.e., are arranged proximate to each other or are at least partially aligned). As such, in the unlocked state, spring element 160 biases second section 140 in circumferential direction CD1 with respect to first section 110; however, the engagement of protrusion 128 with recess 124 prevents such rotation. Upon insertion of tube 80 into connector body 40, the engagement of shoulder 87 with ball 64A (and subsequently protrusion 128) forces protrusion 128 out of engagement with recess 124 and second section 140 is displaced in circumferential direction CD1 with respect to first section 110 due to the biasing force of spring element 160. Such rotation also causes latch 156 to engage loop 130, thereby non-rotatably connecting second section 140 and first section 110 and locking tube 80 within connector body (i.e., as previously described, displacement of second section 140 in circumferential direction CD1 with respect to first section 110 forces balls 64A-B in radial direction RD1 and into engagement with shoulder 87). It should be appreciated that in some embodiments, while spring element 160 biases second section 140 in circumferential direction CD1 with respect to first section 110 when fluid connection assembly 10 is in the unlocked state, in the locked state spring element 160 does not bias second section 140 with respect to first section 110 at all.

To assembly fluid connection assembly 10, seal 62 is arranged in groove 50. Balls 64A and 64B are arranged in apertures 55A and 55B, respectively. Collar 100 is then connected to connector body 40. First section 110 is arranged circumferentially around radially outward facing surface 52 with end 112, specifically notches 122, engaged with protrusions 57 (or head 58). First section 110 is now rotatably connected to connector body 40.

Spring element 160 is then arranged in channel 120 with end 162 engaged with crevice 132 and end 164 extending out of channel 120 and protruding from end 114 in axial direction AD2. Section 140 is then arranged circumferentially around radially outward facing surface with end 142 facing end 114. End 164 is engaged with crevice 158 and end 142 is arranged proximate to and/or abuts against end 114. Retaining ring 66 is then connected to connector body 40, specifically in groove 54. Thus, collar 100 is prevented from axially displacing in axial direction AD1 by protrusions 57 (or head 58) and axial direction AD2 by retaining ring 66.

Second section 140 should then be displaced circumferentially with respect to first section 110 to the unlocked state shown in FIG. 1B (if not already). For example, second section 140 is displaced in circumferential direction CD2 with respect to first section 110, which preload spring element 160, until protrusion 128 is engaged with recess 152. As previously described, the engagement of protrusion 128 with recess 152 maintains fluid connection assembly 10 in the unlocked position (i.e., prevents spring element 160 from displacing second section 140 in circumferential direction CD1 with respect to first section 110). In the unlocked position, since spring element 160 is preloaded, tension therein biases second section 140 in circumferential direction CD1 with respect to first section 110. Also in the unlocked position, latch 156 is spaced apart in a circumferential direction from loop 130.

Once collar 100 is connected, in the unlocked state, to connector body 40, tube 80 may then be inserted therein. As best shown in FIGS. 5B and 6B, in the unlocked state balls 64A and 64B are capable of displacing radially outward in radial direction RD2 into the deep portions of pockets 150A and 150B, respectively. Tube 80 is inserted into through-bore 41, with end 82 first, in axial direction AD1. Radially outward facing surface 86 of shoulder 87 engages balls 64A-B displacing them in radial direction RD2 until shoulder 87 axially clears balls 64A-B and radially outward facing surface 86 is arranged proximate to and/or abuts against radially inward facing surface 26 (or surface 47). As previously discussed, engagement of shoulder 87 with ball 64A forces protrusion 128 radially outward and out of engagement with recess 152. Spring element 160 then automatically displaces second section 140 in circumferential direction CD1 with respect to first section 110 such that latch 156 engages loop 130 thereby non-rotatably connecting sections 110 and 140. The rotation of second section 140 also displaces balls 64A-B in radial direction RD1 (due to pockets 150A-B and/or radially inward facing surface 146) and into engagement with shoulder 87, specifically radially outward facing surface 88. Since balls 64A-B cannot be displaced in radial direction RD2 with respect to connector body 40, and second section 140 cannot be displaced in circumferential direction CD2 with respect to first section 110, tube 80 is locked in connector body 40.

To unlock fluid connection assembly 10, the radially outer portion of latch 56 must be plastically deformed to access the radially inner portion of latch 56. Then radially inner portion of latch 56 is displaced radially inward to disengage the tang thereon from loop 30, at which point second section 140 can be displaced in circumferential direction CD2 with respect to first section 110. Balls 64A-B are again permitted to displace in radial direction RD2 into pockets 150A-B, respectively, and thus tube 80 can be removed from connector body 40.

It should be further appreciated that the location of protrusion 128 may also provide a visual indicator of the status of fluid connection assembly 10. For example, when protrusion 128 is arranged in or over recess 152, fluid connection assembly 10 is in the unlocked position. When protrusion 128 is not arranged in or over recess 152 (or over recess 153), fluid connection assembly 10 is in the locked position. Recess 152 may comprise a color (e.g., red) that aids in the visual indication process. For example, when red is visible, fluid connection assembly 10 is in the locked position and, when red is not visible, fluid connection assembly 10 is in the unlocked position.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Seal
22 End
24 End
26 Radially inward facing surface
28 Radially outward facing surface
40 Connector body
41 Through-bore
42 End
44 End
46 Radially inward facing surface 47 Surface
48 Radially inward facing surface
50 Groove
52 Radially outward facing surface
54 Groove
55A Aperture
55B Aperture
56 Groove
58 Head
60 Radially outward facing surface
62 Seal
64A Ball or detent
64B Ball or detent
66 Retaining ring
80 Tube
82 End
83 Section
84 Radially outward facing surface
86 Radially outward facing surface
87 Shoulder
88 Surface
89 Section
90 Radially outward facing surface
92 End
94 Through-bore
100 Locking collar or collar
110 Section
112 End
114 End
116 Radially inward facing surface
118 Radially outward facing surface
120 Channel
122 Notch
124 Recess
126 Arm
128 Protrusion
130 Loop
132 Crevice
140 Section
142 End
144 End
146 Radially inward facing surface
148 Radially outward facing surface
150A Pocket
150B Pocket
152 Recess
153 Recess
154 Through-bore
156 Latch
158 Crevice
160 Spring element or torsion spring
162 End
164 End
AD1 Axial direction
AD2 Axial direction
CD1 Circumferential direction
CD2 Circumferential direction
RD1 Radial direction
RD2 Radial direction
α Angle
β Angle

What is claimed is:

1. A fluid connection assembly, comprising:
a connector body, including:
   a first end;
   a second end;
   a first through-bore;
   a radially outward facing surface including at least one aperture extending from the radially outward facing surface to the first through-bore; and
   at least one detent arranged in the at least one aperture; and
a collar connected to the connector body, the collar including:
   a first section non-rotatably connected to the connector body, the first section comprising an arm including a protrusion; and
   a second section including a radially inward facing surface engaged with the radially outward facing surface, at least one pocket extending radially outward from the first radially inward facing surface, and a recess;
   wherein:
      the second section is engaged with and rotatable with respect to the first section; and
      the protrusion is operatively arranged to engage the recess to maintain an unlocked state of the fluid connection assembly.

2. The fluid connection assembly as recited in claim 1, wherein:
in an unlocked state, the at least one detent is engaged with the at least one pocket; and
in a locked state, the at least one detent is engaged with the radially inward facing surface and extends into the first through-bore.

3. The fluid connection assembly as recited in claim 1, wherein the at least one pocket increases in depth in a first circumferential direction.

4. The fluid connection assembly as recited in claim 1, wherein the at least one aperture is frusto-conical.

5. The fluid connection assembly as recited in claim 1, wherein the second section further comprises a second through-bore arranged in the recess, wherein the at least one detent is operatively arranged to engage the second through-bore to displace the protrusion radially outward.

6. The fluid connection assembly as recited in claim 1, further comprising a spring element arranged between the first section and the second section, the spring element operatively arranged to bias the fluid connection assembly toward a locked state.

7. The fluid connection assembly as recited in claim 1, wherein:
the first section further comprises a loop; and
the second section further comprises a latch operatively arranged to engage the loop to non-rotatably connect the second section and the first section.

8. The fluid connection assembly as recited in claim 7, wherein the latch comprises:
a first radially inward portion operatively arranged to engage the loop to non-rotatably connect the second section and the first section; and
a second radially outward portion completely overlapping the first radially inward portion.

9. The fluid connection assembly as recited in claim 7, wherein:
in an unlocked state, the second section is rotatable with respect to the first section; and
in a locked state, the second section is non-rotatably connected to the first section.

10. The fluid connection assembly as recited in claim 1, further comprising a retaining ring operatively arranged in a groove of the connector body to connect the collar to the connector body.

11. The fluid connection assembly as recited in claim 1, further comprising a tube including a shoulder, wherein the at least one detent is arranged to engage the shoulder to secure the tube to the connector body.

12. The fluid connection assembly as recited in claim 11, wherein the shoulder comprises:
 a first frusto-conical surface increasing in diameter in a first axial direction; and
 a second frusto-conical surface extending from the first frusto-conical surface, the second frusto-conical surface decreasing in diameter in the first axial direction.

13. The fluid connection assembly as recited in claim 1, further comprising a spring element arranged between the first section and the second section, the spring element operatively arranged to bias the second section in a circumferential direction with respect to the first section.

14. A fluid connection assembly, comprising:
 a connector body, including:
  a first end;
  a second end;
  a first through-bore;
  a radially outward facing surface including at least one aperture extending from the radially outward facing surface to the first through-bore; and
  at least one detent arranged in the at least one aperture; and
 a collar connected to the connector body, the collar including:
  a first section non-rotatably connected to the connector body, the first section comprising a loop; and
  a second section including:
   a radially inward facing surface engaged with the radially outward facing surface;
   at least one pocket extending radially outward from the radially inward facing surface; and
   a latch comprising a first radially inward portion operatively arranged to engage the loop to non-rotatably connect the second section and the first section and a second radially outward portion overlapping the first radially inward portion;
  wherein the second section is engaged with and rotatable with respect to the first section.

15. The fluid connection assembly as recited in claim 14, wherein:
 in an unlocked state, the at least one detent is engaged with the at least one pocket; and
 in the locked state, the at least one detent is engaged with the radially inward facing surface and extends into the first through-bore.

16. The fluid connection assembly as recited in claim 14, wherein the at least one pocket increases in depth in a first circumferential direction.

17. The fluid connection assembly as recited in claim 14, wherein:
 the first section further comprises an arm including a protrusion; and
 the second section further comprises a recess, the protrusion operatively arranged to engage the recess to maintain an unlocked state of the fluid connection assembly.

18. The fluid connection assembly as recited in claim 17, wherein the second section further comprises a second through-bore arranged in the recess, wherein the at least one detent is operatively arranged to engage the second through-bore to disengage the protrusion from the recess.

19. The fluid connection assembly as recited in claim 14, further comprising a spring element arranged between the first section and the second section, the spring element operatively arranged to bias the fluid connection assembly toward a locked state.

20. A fluid connection assembly, comprising:
 a connector body, including:
  a first end;
  a second end;
  a first through-bore;
  a first radially outward facing surface including at least one aperture extending from the first radially outward facing surface to the first through-bore; and
  at least one detent arranged in the at least one aperture; and
 a collar connected to the connector body, the collar including:
  a first section non-rotatably connected to the connector body;
  a second section including a radially inward facing surface engaged with the first radially outward facing surface and including at least one pocket extending radially outward therefrom, wherein the second section is engaged with and rotatable with respect to the first section; and
  a spring element arranged between the first section and the second section, the spring element operatively arranged to bias the second section in a circumferential direction with respect to the first section.

* * * * *